(12) United States Patent
Madhow et al.

(10) Patent No.: US 6,175,587 B1
(45) Date of Patent: Jan. 16, 2001

(54) COMMUNICATION DEVICE AND METHOD FOR INTERFERENCE SUPPRESSION IN A DS-CDMA SYSTEM

(75) Inventors: Upamanyu Madhow, Urbana; Colin D. Frank, Chicago; Phillip D. Rasky, Buffalo Grove, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/000,985

(22) Filed: Dec. 30, 1997

(51) Int. Cl.[7] .................................................. H04L 27/30
(52) U.S. Cl. ........................ 375/148; 375/147; 375/150; 370/335; 455/442; 455/133; 455/137
(58) Field of Search ..................................... 375/130, 140, 375/142, 144, 147, 148, 150, 267, 346–349; 370/335, 331, 342; 455/132, 133–135, 137, 436, 442, 506

(56) References Cited

U.S. PATENT DOCUMENTS

| | | | |
|---|---|---|---|
| 4,829,543 | 5/1989 | Borth et al. ............................ 375/83 |
| 5,105,435 | 4/1992 | Stilwell .................................... 375/1 |
| 5,136,612 | 8/1992 | Bi ............................................ 375/1 |
| 5,267,261 | 11/1993 | Blakeney, II et al. .................. 375/1 |
| 5,305,349 | 4/1994 | Dent . | |
| 5,361,276 | 11/1994 | Subramanian . | |
| 5,377,226 | 12/1994 | Davis ...................................... 375/1 |
| 5,383,220 | 1/1995 | Murai ...................................... 375/1 |
| 5,396,516 | 3/1995 | Padovani et al. .................... 375/225 |
| 5,463,657 | 10/1995 | Rice ..................................... 375/200 |
| 5,463,660 | * 10/1995 | Fukasawa et al. .................. 370/342 |
| 5,508,708 | * 4/1996 | Ghosh et al. ........................ 342/457 |
| 5,550,810 | 8/1996 | Monogioudis ......................... 370/18 |
| 5,553,062 | 9/1996 | Schilling et al. ...................... 370/18 |
| 5,572,552 | 11/1996 | Dent et al. ............................ 375/343 |
| 5,610,554 | 3/1997 | Anvari ................................... 330/52 |
| 5,621,752 | 4/1997 | Antonio et al. ...................... 375/200 |
| 5,627,835 | * 5/1997 | Witter .................................. 370/320 |
| 5,671,255 | 9/1997 | Wang et al. .......................... 375/341 |
| 5,677,930 | 10/1997 | Bottomly .............................. 375/208 |
| 5,764,687 | * 6/1998 | Easton .................................. 375/206 |
| 5,889,815 | * 3/1999 | Iwakiri ................................. 375/208 |
| 5,950,131 | * 9/1999 | Vilmur ................................. 455/434 |
| 6,009,089 | * 12/1999 | Huang et al. ........................ 370/342 |
| 6,014,373 | * 1/2000 | Schilling et al. .................... 370/342 |
| 6,034,986 | * 3/2000 | Yellin .................................. 375/148 |
| 6,078,611 | * 6/2000 | LaRosa et al. ...................... 375/141 |

FOREIGN PATENT DOCUMENTS

| | | |
|---|---|---|
| 0 526 39 A1 | 2/1993 | (EP) . |
| 0 641 102 A2 | 3/1995 | (EP) . |
| 0825727A1 | 2/1998 | (EP) . |
| 2268364 | 1/1994 | (GB) . |
| WO 97/08846 | 3/1997 | (WO) . |
| WO 97/24816 | 7/1997 | (WO) . |

OTHER PUBLICATIONS

Klein, A., "Data Detection Algorithms Specially Designed for the Downlink of CDMA Mobile Radio Systems", 1997 IEEE 47th Vehicular Technology Conference, May 4–7, 1997, 203–207.

* cited by examiner

Primary Examiner—Young T. Tse
(74) Attorney, Agent, or Firm—John G. Rauch; Michael C. Soldner (57) ABSTRACT

Method and apparatus for completely suppressing interference vectors in a DS-CDMA communication system (100). Receiver circuits (122, 124, 126, 128) are assigned (404, 406) to multipath from sectors both in soft handoff and not in soft handoff with the receiver. For each receiver circuit, a set of traffic channels present on the sector's signal is determined (410). For each receiver circuit, the interference is ranked (412) according to predetermined interference criteria. A set of interference vectors is selected (414) from the ranked lists of interference and an orthogonal projection is computed (416) of the receiver's desired code or Walsh code relative to the selected set of interference vectors. The receiver circuit then uses the orthogonal projection in its correlator to despread (418) received data.

33 Claims, 5 Drawing Sheets

COMMUNICATION DEVICE AND METHOD FOR INTERFERENCE SUPPRESSION IN A DS-CDMA SYSTEM

FIELD OF THE INVENTION

The present invention generally relates to reception of direct sequence code division multiple access (DS-CDMA) signals. More particularly, the present invention relates to interference suppression for DS-CDMA signals.

BACKGROUND OF THE INVENTION

In a spread spectrum communication system, downlink transmissions from a base station to a mobile station include a pilot channel and a plurality of traffic channels. The pilot channel is decoded by all users. Each traffic channel is intended for decoding by a single user. Therefore, each traffic channel is encoded using a code known by both the base station and mobile station. The pilot channel is encoded using a code known by the base station and all mobile stations. Encoding the pilot and traffic channels spreads the spectrum of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System" ("IS-95"). Individual users in the system use the same frequency but are distinguishable from each other through the use of individual spreading codes. Other spread spectrum systems include radiotelephone systems operating at 1900 MHz, commonly referred to as DCS1900. Other radio and radiotelephone systems use spread spectrum techniques as well.

IS-95 is an example of a direct sequence code division multiple access (DS-CDMA) communication system. In a DS-CDMA system, transmissions are spread by a pseudo-random noise (PN) code. Data is spread by chips, where the chip is the spread spectrum minimal-duration keying element. One system parameter is the chip duration or chip time. In an IS-95 system, the chip clock rate is 1.2288 Mega-chips per second, equivalent to a chip time of about 0.814 $\mu$sec/chip.

Mobile stations for use in spread spectrum communication systems commonly employ RAKE receivers. A RAKE receiver includes two or more receiver fingers which independently receive radio frequency (RF) signals. Each finger estimates channel gain and phase using the pilot signal. The gain and phase estimates are used to coherently demodulate the RF signal, thereby producing an estimate of each traffic symbol. The traffic symbol estimates of the individual receiver fingers are combined in a symbol combiner to produce a better estimate of the traffic symbols.

A RAKE receiver is used in spread spectrum communication systems to combine multipath rays and thereby exploit channel diversity. Multipath rays include both line of sight rays received directly from the transmitter as well as rays reflected from objects and terrain. The multipath rays received at the receiver are separated in time. The time separation or time difference is typically on the order of several chip times. By combining the separate RAKE finger outputs, the RAKE receiver achieves path diversity.

Generally, the RAKE receiver fingers are assigned to the strongest set of multipath rays. That is, the receiver locates local maxima of the channel impulse response. A first finger is assigned to receive the strongest signal, a second finger is assigned to receive the next strongest signal, and so on. As the channel changes, due to fading and other causes, the finger assignments are changed. After finger assignment, the time locations of the local maxima drift slowly, and these changes are tracked by time tracking circuits in each finger.

One limitation on the performance of a DS-CDMA receiver is multiple-access interference at the receiver. Considered on a per finger basis, there generally are two sources of multiple-access interference on the forward link, from base station to the subscriber unit. The first source is multipath originating from the same base station or the same sector of the same base station as the received signal of interest. The multiple traffic signals transmitted from the base station are orthogonal at the base station's transmitter, because the covering Walsh codes are orthogonal. In the RAKE receiver, interference from orthogonal received traffic signals is completely suppressed. However, multipath in the channel between the base station and the receiver destroys the orthogonality of the Walsh codes by introducing time delay. As a result, some multiple-access interference is introduced. For a finger assigned to a signal from one sector, the second source of multiple-access interference is interference from sectors other than that to which the finger is assigned, both those sectors in soft-handoff with the subscriber unit and those not in soft-handoff with the subscriber unit. The signals transmitted from these other sectors are not orthogonal, regardless of the channel, so some multiple-access interference is introduced at the receiver.

As indicated, the sources of multiple access interference must be viewed on a finger by finger basis. Different fingers may be assigned to different sectors. Thus, same-sector multiple access interference for finger 1 will be other-sector interference for finger 2, if finger 2 is assigned to a different sector.

Noise suppression systems developed for other types of communication systems do not apply to DS-CDMA systems, particularly as applied in the subscriber unit. In some of these prior systems, the number of chips per symbol for the spreading sequence is equal to the period of the spreading sequence. In other prior systems, interference suppression is applied at the base.

In DS-CDMA systems, the spreading sequence may be many times longer than the number of chips per symbol. In IS-95, for example, the spreading sequence repeats every 512 symbols. If the period of the spreading sequence is not equal to the number of chips per symbol, interference suppression is much more difficult. The multiple-access interference in such a situation is no longer stationary. Rather, it is time varying. Both the interference and the coefficients of the interference suppression receiver change completely from one symbol to the next. Because the multiple-access interference is time varying, interference suppression cannot be implemented adaptively and the receiver must explicitly estimate certain features of the interference before the interference can be suppressed.

Accordingly, there is a need in the art for an improved interference suppression technique for DS-CDMA systems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
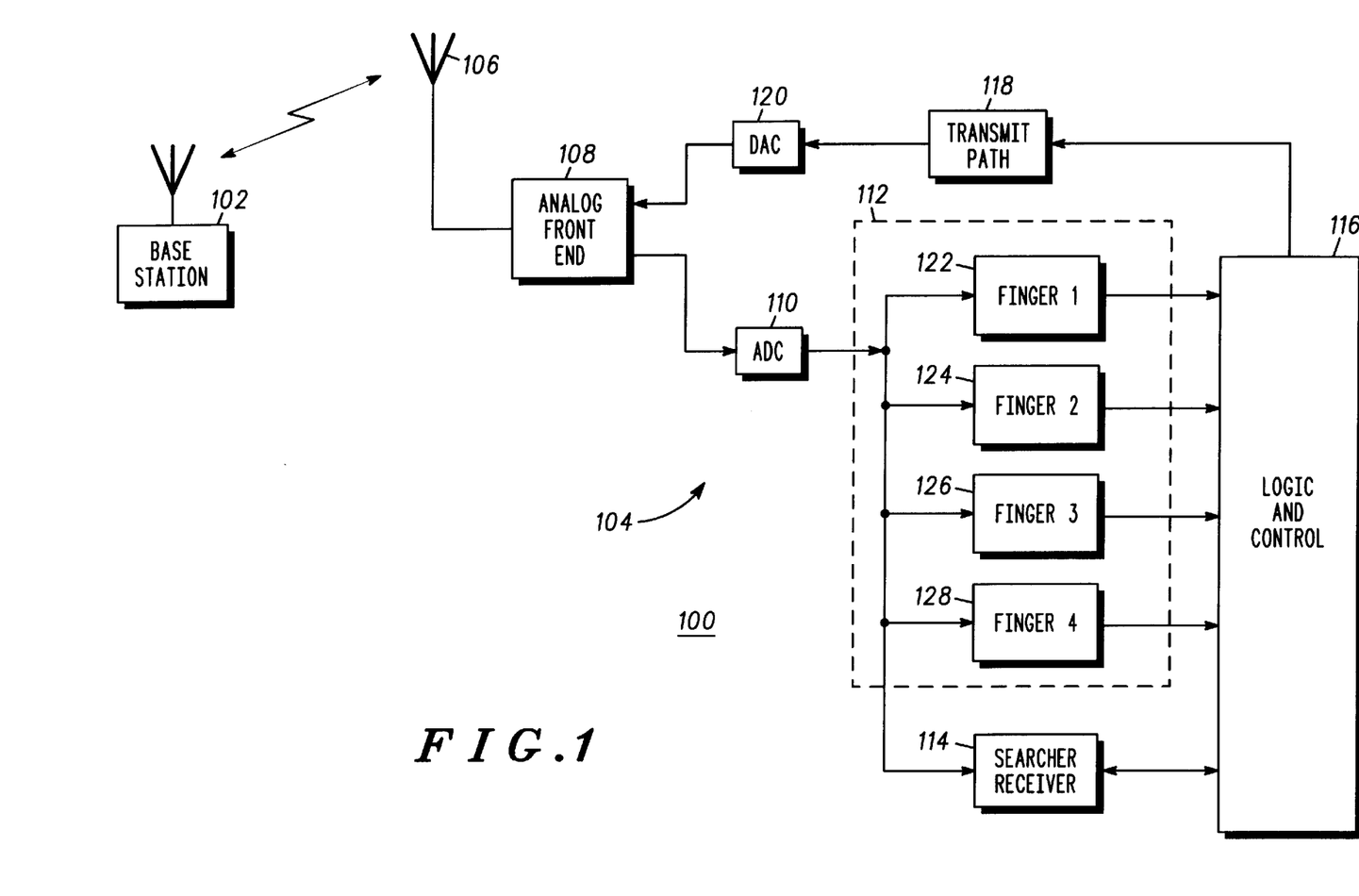
FIG. 1 is a block diagram of a communication system.

Referring now to FIG. 1, a communication system 100 includes a plurality of base stations such as base station 102 configured for radio communication with one or more mobile stations such as radiotelephone 104. The radiotelephone 104 is configured to receive and transmit direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including (Personal Communication Systems (PCS) systems at 1800 MHz or with any other suitable DS-CDMA system.

The base station 102 is one base station of one or more base stations which transmit radio frequency (RF) signals, the RF signals formed by mixing a baseband signal with an RF carrier. The baseband signal is formed by spreading data symbols with a periodic spreading sequence having a period substantially greater than the number of chips per symbol. Since the period of the spreading sequence is not equal to the number of chips per symbol, multiple-access interference at the radiotelephone 104 is not stationary, but is time-varying.

The base station 102 transmits spread spectrum signals to the radiotelephone 104. The symbols on the traffic channel are spread using a Walsh code in a process known as Walsh covering. Each mobile station such as the radiotelephone 104 is assigned a unique Walsh code by the base station 102 so that the traffic channel transmission to each mobile station from the base station 102 is orthogonal to traffic channel transmissions to every other mobile station from the base station 102.

In addition to traffic channels, the base station 102 broadcasts a pilot channel, a synchronization channel and a paging channel. The pilot channel is formed using an all-zero sequence that is covered by Walsh code 0. The pilot channel is commonly received by all mobile stations within range and is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

In addition to the Walsh covering, all channels transmitted by the base station are spread using a pseudorandom noise (PN) sequence, also referred to as the spreading code. The base station 102 and all base stations within a large neighborhood of base station 102 are uniquely identified by using a unique starting phase, also referred to as a starting time or phase shift, for the spreading code. The sequences are of length $2^{15}$ chips and are produced at a chip rate of 1.2288 Mega-chips per second and thus repeat every 26-⅔ milliseconds. The minimum permitted time separation is 64 chips, allowing a total of 512 different PN code phase assignments. The spread pilot channel modulates a radio frequency (RF) carrier and is transmitted to all mobile stations including the radiotelephone 104 in a geographic area served by the base station 102. The PN sequence is complex in nature, comprising both in-phase (I) and quadrature (Q) components. It will be recognized by those ordinarily skilled in the art that all processing of the pilot signal described herein involves both I and Q components.

The radiotelephone 104 comprises an antenna 106, an analog front end 108, a receive path including an analog to digital converter (ADC) 110, a RAKE receiver 112 and a searcher receiver 114, a controller 116, and a transmit path including a transmission path circuit 118 and a digital to analog converter 120. The antenna 106 receives RF signals from the base station 102 and from other base stations in the vicinity. Some of the received RF signals are line of sight rays transmitted by the base station. Other received RF signals are reflected or multipath rays and are delayed in time.

Received RF signals are converted to electrical signals by the antenna 106 and provided to the analog front end 108. The analog front end 108 filters the signals and provides conversion to baseband signals. The analog baseband signals are provided to the ADC 110, which converts them to streams of digital data for further processing.

The RAKE receiver 112 includes a plurality of receiver circuits, also referred to as receiver fingers, including receiver finger 122, receiver finger 124, receiver finger 126 and receiver finger 128. In the illustrated embodiment, the RAKE receiver 112 includes four receiver fingers. However, any suitable number of receiver fingers could be used. The structure and operation of the receiver fingers will be described below in connection with FIG. 2.

The controller 116 is coupled to other elements of the radiotelephone 104. Such interconnections are not shown in FIG. 1 so as to not unduly complicate the drawing figure.

The searcher receiver 114 detects pilot signals received by the radiotelephone 104 from the plurality of base stations including the base station 102. The searcher receiver 114 despreads pilot signals using a correlator with PN codes generated in the radiotelephone 104 using local reference timing.

Receiver circuits of the RAKE receiver 112 are assigned in response to the pilot signals identified by the searcher receiver 114. In accordance with the present invention, receiver circuits are assigned to both sectors which are in soft hand-off with the radiotelephone 104 and to sectors which are not in soft-handoff with the radiotelephone 104. In soft-handoff, the radiotelephone 104 is in radio communication with two or more base stations or sectors. Each of the base stations or sectors in soft handoff with the radiotelephone 104 transmits the same data to the radiotelephone 104 simultaneously. However, since the base stations use different spreading sequences and possibly different Walsh codes to encode the data, the receiver must demodulate each base station's transmission separately. After demodulation, the separate estimates of the transmitted traffic channel data can be combined in the radiotelephone 104.

To assign a finger of the RAKE receiver 112, the radiotelephone 104 identifies a first multipath element having sufficient signal quality and assigns a first receiver finger to the first multipath element. In accordance with the present invention, the radiotelephone 104 assigns a second receiver finger to the second multipath element, and other available receiver fingers to other detected multipath rays.

Figure 2:
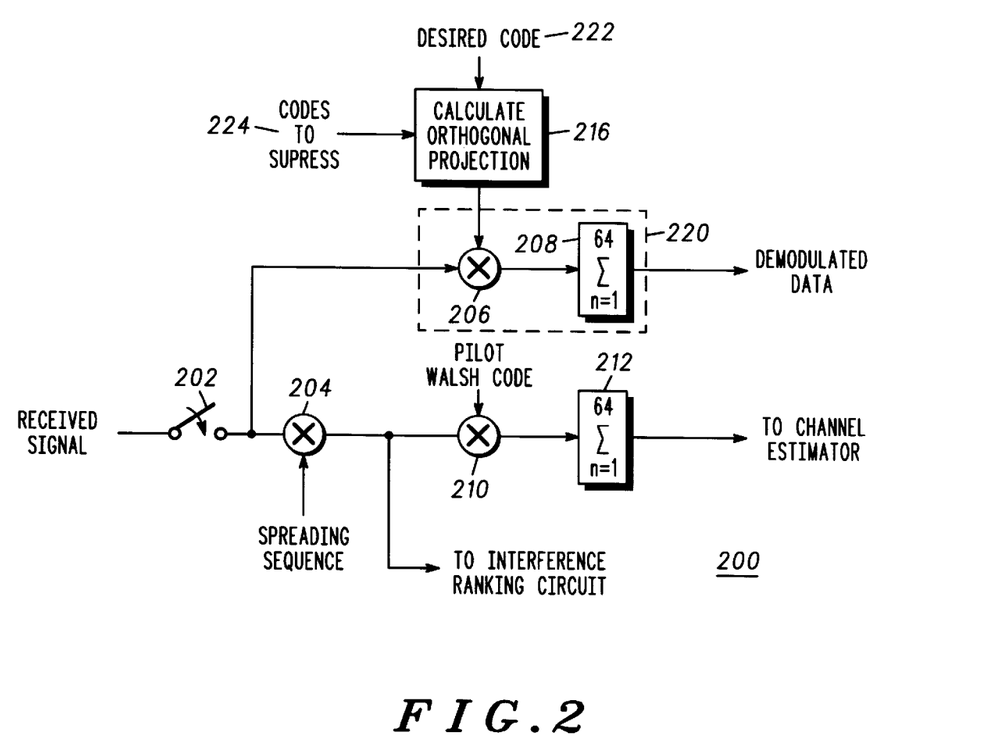
FIG. 2 is a block diagram of a circuit corresponding to a receiver finger.

Referring now to FIG. 2, a receiver circuit 200 for use in the RAKE receiver 112 of FIG. 1 includes a switch 202, a despreader 204, a traffic despreader 206, a summer 208, a pilot despreader 210 and a summer 212. The switch 202 closes at an integer multiple of the chip rate of 1.2288 Mega-chips per second, such as 1X, 2X, 4X or 8X the chip rate. The despreader 204 despreads the received data by applying a spreading sequence which is unique to the base station or sector which transmitted the data. The traffic despreader 206 despreads the data by applying a despreading code which is calculated in a manner to be described below. The summer 208 sums a predetermined number of chips of despread data, such as 64, to produce a symbol, which is provided to the controller 116 as demodulated data. The traffic despreader 206 and summer 208 form a correlator 220.

The pilot despreader 210 applies a pilot Walsh code to the received signal to despread the pilot channel. The despread signal is summed in the summer 212 to produce a pilot symbol. The pilot symbols are provided to the controller 116 to estimate channel gain and phase.

Signals received by the receiver circuit 200 include both a desired signal and multiple-access interference. Two sources of multiple-access interference include multipath signals from the same sector and interference from other sectors, including both those in soft-handoff with the radiotelephone 104 and those not in soft-handoff with the radiotelephone 104.

The matched filter receiver correlates the despread received signal with the radiotelephone's assigned Walsh code. Since the orthogonality of the Walsh codes is preserved over channels with no multipath, the matched filter receiver is optimal for such channels and no interference suppression is necessary. Such a receiver completely suppresses signals which are orthogonal to the desired signal. In FIG. 2, the desired signal is specified by the Walsh code which covers the traffic channel. Multipath signals from the same sector lose orthogonality with the desired signal. Interfering signals from other sectors are not orthogonal. In accordance with the present invention, the desired Walsh code and the interference vectors to be suppressed are supplied to the orthogonal projection calculator 216. A projection of the desired signal is determined which is orthogonal to the designated interference.

Figure 3:
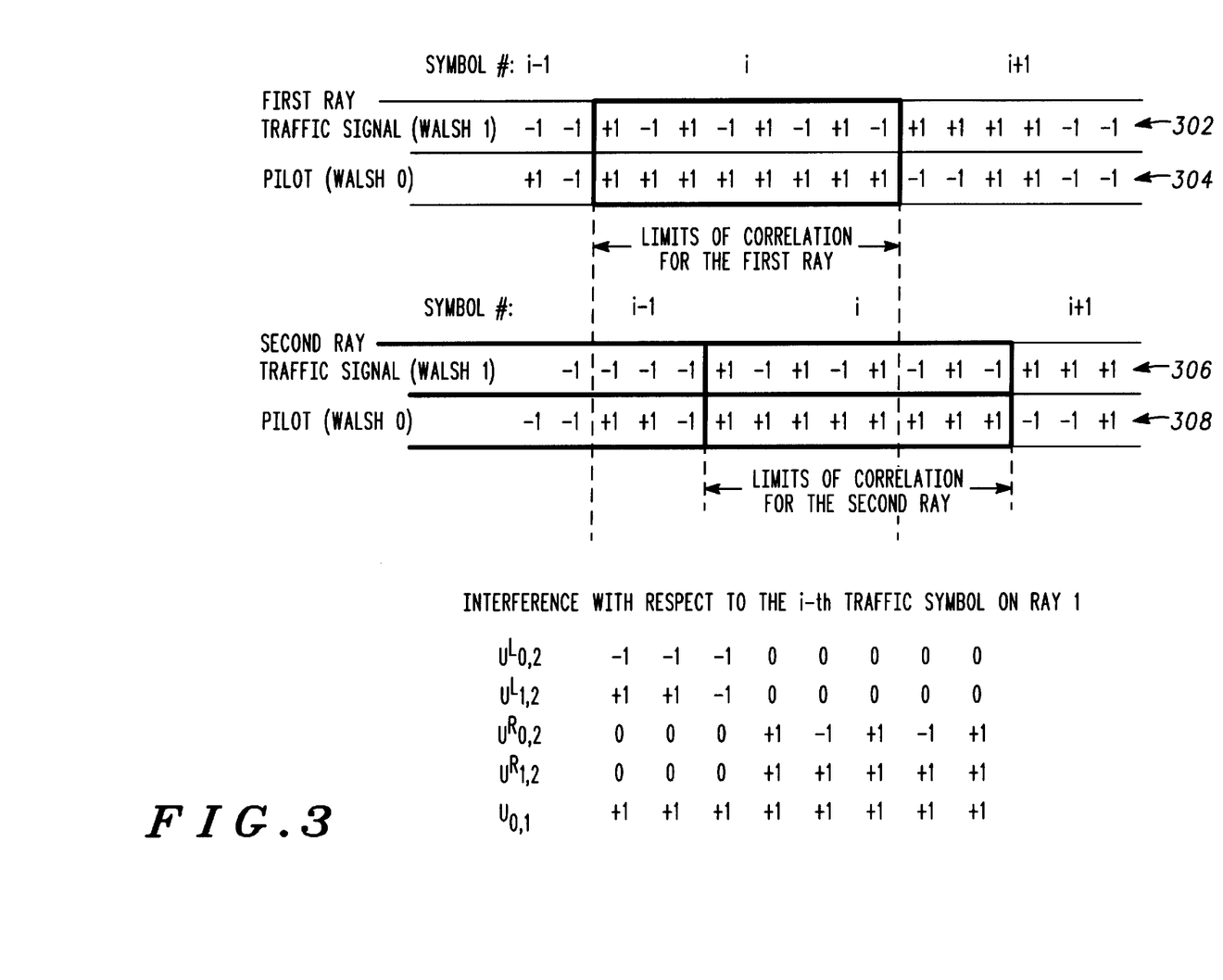
FIG. 3 shows received data including multiple-access interference introduced by multipath.

The model used to analyze symbol asynchronous interference is referred to as the equivalent chip synchronous model. Also, the model is essentially the same whether the multiple-access interference is due to multipath or to interference from a neighboring base station. FIG. 3 shows the separate components of a signal received over a multipath channel, and illustrates how multiple-access interference is introduced. In this example, the base station is transmitting a pilot (Walsh code 0) and a single traffic channel.

In the receiver, a receiver circuit or finger is assigned to each multipath ray. The interference observed by each RAKE receiver finger is different, with respect to both the set of interfering signals and the relative timing offsets of the interference. For this reason, the equivalent synchronous model and the corresponding zero-forcing correlator used to suppress interference will be different for each RAKE finger.

In FIG. 3, the equivalent synchronous model is presented for one of the RAKE fingers. The example in FIG. 3 is for a system using Walsh codes of length 8. The first line 302 and the second line 304 indicate the chip and symbol boundaries of the pilot channel and the traffic channel for the signal received via the first multipath element. The third line 306 and the fourth line 308 indicate the chip and symbol boundaries for the second multipath element. The equivalent synchronous model for the RAKE finger aligned with the first multipath element provides a set of basis vectors for the interference observed by this finger.

The symbol of interest for symbol i is indicated in FIG. 3. Consider the Walsh codes aligned with the second ray that overlaps the symbol of interest. Let $u_{i,j}^L$ denote interference from Walsh code i, multipath ray j, which overlaps the left side of the symbol of interest. From FIG. 3, the interference vectors overlapping the left side of the symbol of interest are given by:

$$u_{0,2}^L = \{-1,-1,-1,0,0,0,0,0\}$$

$$u_{1,2}^L = \{+1,+1,-1,0,0,0,0,0\}$$

The interference vectors correspond to the interfering Walsh code, multiplied by the spreading sequence, over the interval for which the interfering Walsh code overlaps the symbol of interest. Beyond the region of overlap of the Walsh code with the symbol of interest, the elements of the interference vectors are set equal to 0. Similarly, the Walsh codes aligned with the second ray that overlap the right side of the symbol of interest yield interference vectors:

$$u_{0,2}^R = \{0,0,0,+1,-1,+1,-1,+1\}$$

$$u_{1,2}^R = \{0,0,0,+1,+1,+1,+1,+1\}$$

In attempting to suppress interference, an additional source of interference is introduced. So long as the receiver employs a matched filter, the Walsh codes transmitted from the same sector and received with the same delay are orthogonal. However, a correlator designed to suppress interference from multipath will no longer be orthogonal to the other Walsh codes, unless that condition is enforced in the design of the correlator. Therefore, the following interference vector is added to the list for this simple example:

$$u_{0,1} = \{+1,+1,+1,+1,+1,+1,+1,+1\}$$

Two points should be made about the definition of the interference vectors. First, the interference vectors must be split into left and right halves because the two symbols which overlap the symbol interval of interest are independently modulated with independent data symbols. Second, although the Walsh code is repeated every symbol, the PN sequence which multiplies the Walsh code repeats only every 512 symbols. As a result, both the interference and the interference vectors defined above are time-varying and the interference vectors must be recomputed for each new symbol.

The correlator used with zero-forcing interference suppression is the orthogonal projection of the desired Walsh code, spread by the PN sequence, with respect to the plane defined by the interference vectors. In the example above, the desired signal is $$u_{des} = \{+1,-1,+1,-1,+1,-1,+1,-1\}$$

Formally, the orthogonal projection of $u_{des}$ is given by $$c_{zf} = u_{des} - U_I(U_I^T u_{des})$$

where the vector $c_{zf}$ is the zero-forcing correlator and $U_I$ is the interference subspace matrix. The columns of $U_I$ are equal to the set of interference vectors give above. Note that the matrix $U_I^T U_I$ is a square matrix with dimension equal to the number of interference vectors being suppressed. If the matrix $U_I^T U_I$ does not have full rank, the inverse operation should be interpreted as the pseudo-inverse.

Approximations to the orthogonal projection may be useful in that they yield comparable performance with greatly reduced computational complexity and/or memory storage requirements. Useful approximations include $$c_{zf} \approx u_{des} - \sum_{j \in I} \frac{\langle u_j, u_{des} \rangle}{\|u_j\|^2} u_j,$$

where $\|u\|^2$ denotes the energy of the vector u. Other useful approximations will be readily apparent.

Accordingly, the receiver circuit 200 (FIG. 2) includes orthogonal projection calculator 216 which calculates an orthogonal projection of the desired Walsh code, spread by the PN sequence, with respect to the plane defined by the interference vectors. The calculation is made in response to the desired Walsh code 222 and a set of codes to suppress 224 received by the receiver circuit 200. The orthogonal projection is calculated exactly or using any suitable approximation. The orthogonal projection is provided to the traffic despreader 206. In response to the orthogonal projection, the traffic despreader 206 completely suppresses interference from the designated codes or interference vectors.

Figure 4:
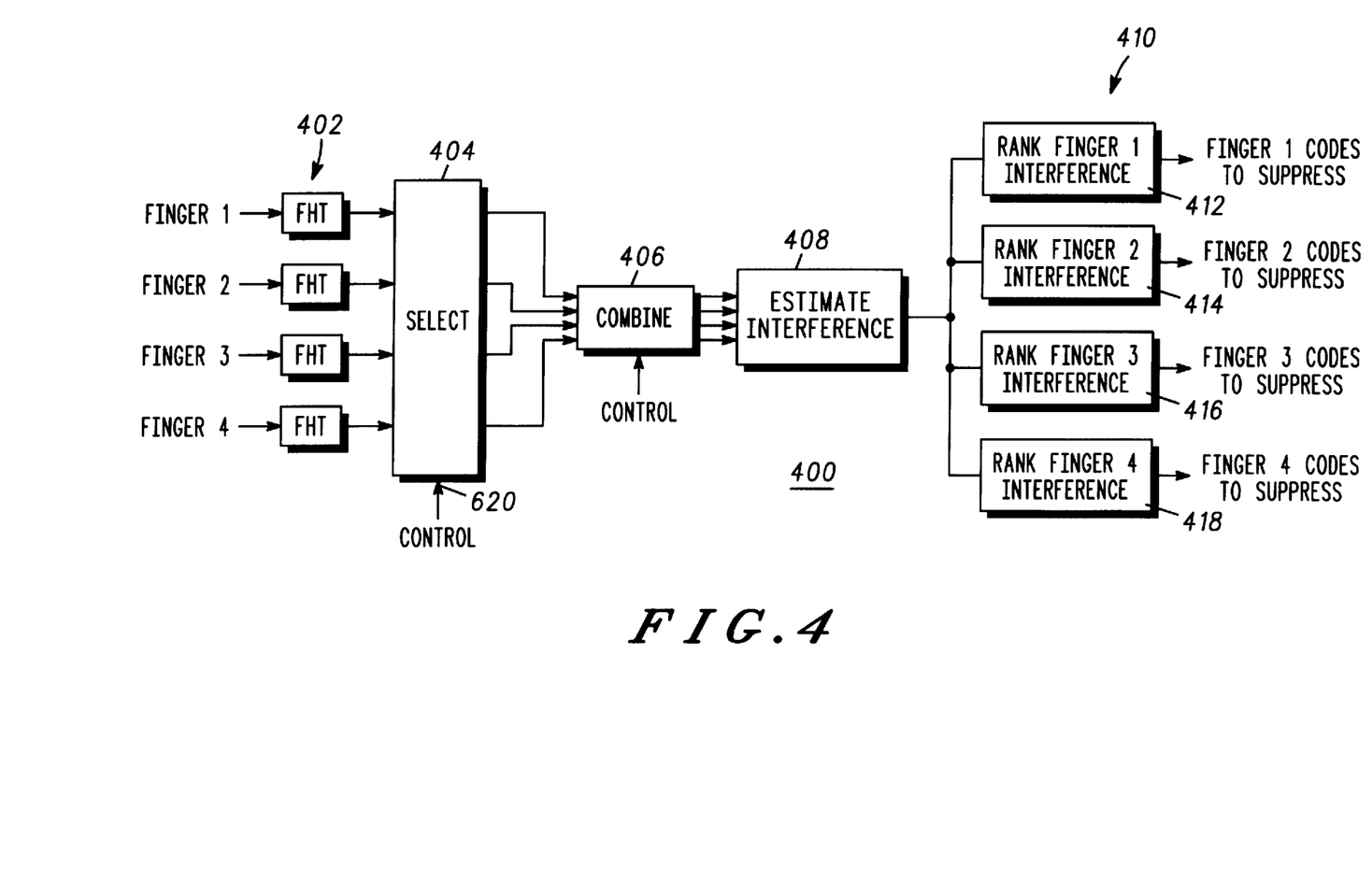
FIG. 4 is a block diagram of an interference ranking circuit for use with the receiver circuit of FIG. 2.

Referring now to FIG. 4, it shows a block diagram of an interference ranking circuit 400 for use with the receiver circuit of FIG. 2. The interference ranking circuit 400 may be used to determine the codes to be suppressed for use in the receiver fingers, such as in the orthogonal projection calculator 216. The interference ranking circuit 400 includes a plurality 402 of Fast Hadamard Transform (FHT) operators, a selector 404, a combiner 406 and an estimate block 408 and ranking circuit 410.

In the illustrated embodiment, the plurality 402 of FHT operators includes one FHT operator per finger of the RAKE receiver 112. In other embodiments, the FHT operators may be shared among the RAKE fingers. The FHT operators produce an indication of which channels are present in a received DS-CDMA signal. The FHT operators essentially correlate the despread signal produced by the despreader 204 against the sixty four possible Walsh symbols (in an IS-95 system) that could have been sent by the transmitter. The indication of which channels are present may also include an indication of received signal strength or of signal energy.

The selector 404 selects which FHT operator outputs to combine in the combiner 406. The selector 404 is controlled by a control signal received at an input 620. The control signal is provided, for example, by the controller 116 (FIG. 1). In accordance with the present invention, some fingers of the RAKE receiver circuit are assigned solely for the purpose of measuring interference parameters. One or more fingers may be assigned to sectors with which the radiotelephone 104 is in soft hand-off. Moreover, one or more fingers may be assigned to sectors with which the radiotelephone 104 is not in soft hand-off for the purpose of measuring interference. If two or more fingers are assigned to the same sector, the selector 404 operates to select those two or more fingers and provide them together to the combiner 406 so that they may be combined to give the best estimate of traffic channels present and channel strength.

After the channels have been combined, if necessary, the indications of channels present are provided to the estimate block 408. Estimate block 408 forms an estimate of the channels present at each finger and provides the estimate to the ranking circuit 410. The ranking circuit 410 ranks the channels according to predetermined criteria. The ranking circuit includes a first finger ranking circuit 412, a second finger ranking circuit 414, a third finger ranking circuit 416 and a fourth finger ranking circuit 418. Ranking is performed separately for each finger assigned to multipath from sectors in soft hand-off with the radiotelephone 104. Ranking is not required for fingers not in soft handoff. Ranking is done because not all interference should be suppressed. A tradeoff exists between the amount of interference suppressed and the amount of signal energy lost.

From the perspective of any receiver circuit or finger, interference can be of three types: (i) multipath from the sector being demodulated by that finger; (ii) multipath from a sector in soft handoff with the radiotelephone; and (iii) multipath from another sector not in soft handoff with the radiotelephone. All of these sources must be included in the list of interference. Source (i) must be included in the list even though it is not a source of interference for a prior receiver which correlates each finger with the Walsh code assigned to the radiotelephone. The interference suppression receiver in accordance with the present invention does not simply correlate with the assigned Walsh code, and orthogonality to other traffic channels received from the same sector and with the same delay is lost.

For a particular finger, the strength or weight assigned to each interference vector is typically proportional to the following: (i) the amount by which the interference vector overlaps with the symbol interval of the finger under consideration; and (ii) the magnitude of the interference vector. An interference vector is a particular Walsh code corresponding to a particular sector/delay. Any suitable process may be used to rank the interference, and any other suitable parameters may be used for ranking. In the preferred embodiment, interference ranking is applied separately for each receiver circuit or receiver finger assigned to multipath from sectors in soft handoff with the radiotelephone.

The ranking circuit 410 produces a set of codes to suppress. The codes to suppress are interference vectors selected from the ranked interference list for the given finger. In the illustrated embodiment, the interference vectors are partially overlapping spread Walsh codes from this and other sectors/delays. Here, spread Walsh code refers to the Walsh code multiplied by the PN spreading sequence. The codes to suppress are provided from the ranking circuit 410 to the orthogonal projection calculator 216 (FIG. 2) of each finger.

The orthogonal projection calculator 216, in response to the codes or interference vectors to suppress and the desired spread Walsh code, calculates an orthogonal projection of the desired spread Walsh code relative to the selected set of interference vectors. In the illustrated DS-CDMA embodiment, the desired code is the assigned Walsh code for the finger multiplied by the appropriate phase of the PN spreading sequence. One suitable process for calculating the orthogonal projection is described above. Other methods may be substituted to reduce computational complexity or storage requirements.

After calculation of the orthogonal projection of the desired spread Walsh code, the finger uses the orthogonal projection (rather than the desired code or Walsh code itself) in its correlator. The orthogonal projection is provided to the traffic despreader 206. The traffic despreader 206 despreads received chip data by applying the orthogonal projection as a despreading code. The summer 208 sums a predetermined number of chips of despread data, such as 64, to produce a symbol, which is provided to the controller 116 as demodulated data. By taking the projection of the Walsh code orthogonal to the interference, the designated interference is completely suppressed.

Note that other methods, such as interference cancellation or subtraction, must demodulate the interference and estimate its amplitude in order to subtract it. Such methods are susceptible to error propagation due to errors made in demodulating the interference. In the method here, it is only necessary to identify which codes should be suppressed and estimate the time at which these signals arrive at the receiver (or estimate the delay from the transmitter). The method and apparatus in accordance with the present invention does not need to demodulate or estimate amplitude, only to rank the amplitude. There is no possibility of error propagation.

The interference observed by a particular finger is due to the spread Walsh codes of other fingers/multipath. While the Walsh codes are constant from symbol to symbol, the spread Walsh codes are not because the PN sequence which multiplies the Walsh codes only repeats every 512 symbols (in the illustrated IS-95 embodiment). For this reason, the multiple-access interference is time varying and the interference vectors change every symbol. As a result, the orthogonal projection must be computed for each finger and must be recomputed for each symbol.

Figure 5:
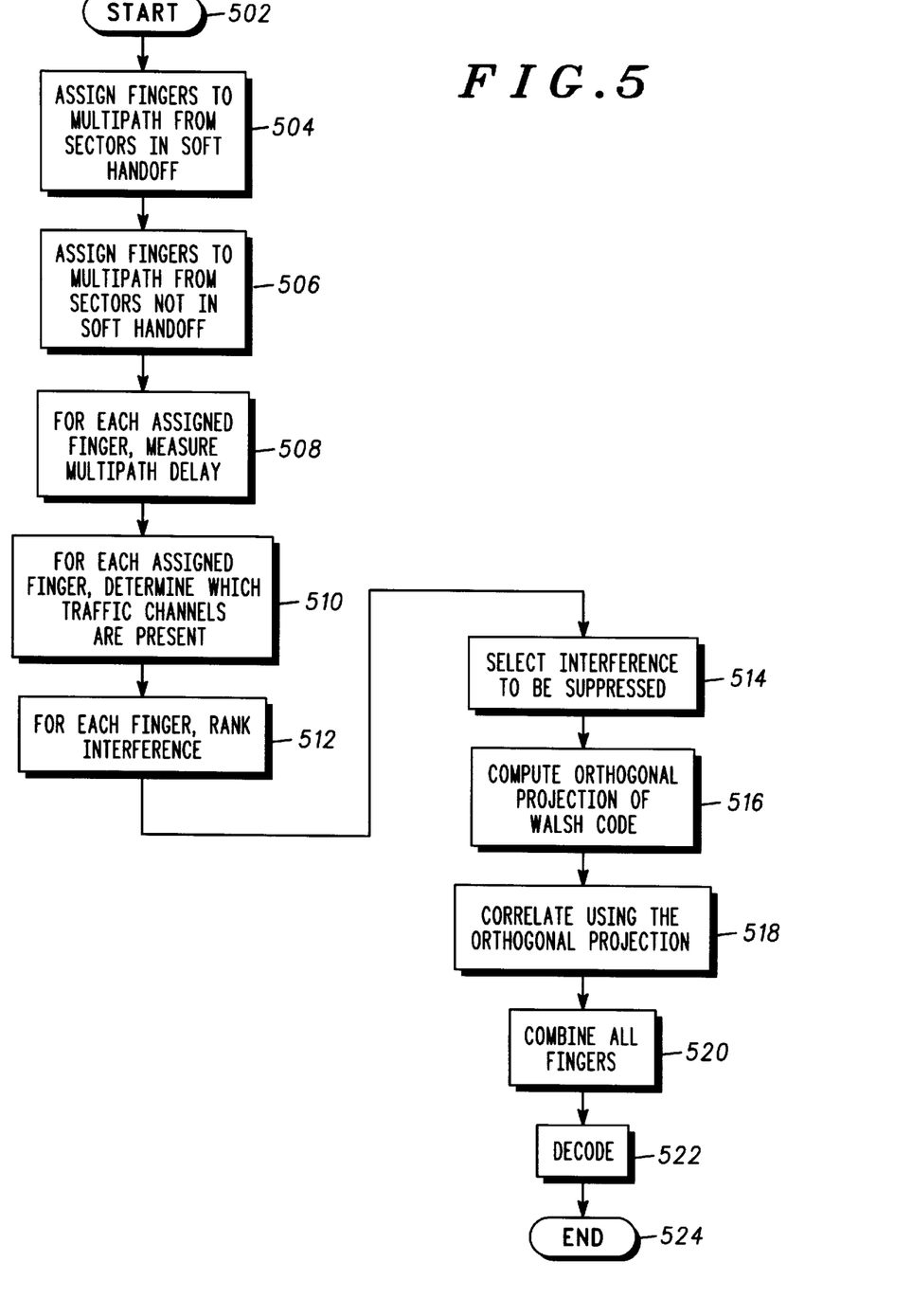
FIG. 5 is a flow diagram illustrating interference suppression in accordance with the present invention.

Referring now to FIG. 5, a flow diagram illustrates a method for operating a communication device such as the radiotelephone 104 of FIG. 1 according to the present invention. The method begins at step 502.

At step 504, fingers or other receiver circuits are assigned to sectors in soft handoff, if any, with the communication device. Similarly, at step 506, fingers are assigned to multipath from sectors not in soft handoff. Preferably, all available fingers are assigned either to multipath from sectors in soft handoff with the radiotelephone or to strong multipath from sectors not in soft handoff. That is, all available fingers are assigned and not left idle. The fingers are either used for combining multipath from soft handoff sectors or are used to identify interference from sectors not in soft handoff. Each receiver circuit is assigned to one multipath element. At step 508, for each assigned finger, the multipath delay is measured. At step 510, it is determined which traffic channels are present at each assigned finger. The Fast Hadamard Transform (FHT) is a suitable method for accomplishing this.

The method continues at step 512, where the interference is ranked for each finger. A list of interference is prepared, ranked by amplitude of the interference, the overlap with the symbol interval, or any other predetermined criteria. In the illustrated embodiment, the amplitude of the interference is used for ranking. The different traffic channels from a sector will have different amplitudes. Preferably, a list of interference is prepared for each finger, ranking the different interference received by the finger. Alternatively, a single list of all interference may be prepared, or multiple lists associated with different fingers. In the illustrated embodiment, the Walsh codes corresponding to the multipath are ranked. The ranked lists of interference are typically stored in memory in the RAKE receiver or the controller or any other suitable location. Thus, at each receiver circuit, interference vectors or codes are ranked according to predetermined criteria.

At step 514, the interference to be suppressed is selected using the ranked lists of interference. Selection may be made using any suitable criteria. For example, the top five interference vectors from each finger's list may be selected, or the top twenty of all ranked interference vectors may be selected. Thus, one or more interference vectors or codes are selected for suppression according to rank. The selected interference vectors are provided as codes to be suppressed.

Using the selected interference vectors, the orthogonal projection of the desired code or assigned spread Walsh code is calculated, step 516. The orthogonal projection is orthogonal to all of the selected interference. At step 518, the received data are correlated or despread using the calculated orthogonal projection. By using the orthogonal projection, all interference corresponding to the selected interference vectors is completely suppressed. Preferably, step 516 and step 518 are performed on a finger-by-finger basis, with correlation being performed independently at each finger to suppress interference at that finger.

At step 520, the output data estimates from the fingers assigned to multipath from sectors in soft handoff are combined, and at step 522 the transmitted symbol is decoded for further processing. Thus, data estimates from the individual fingers, improved by interference suppression, are combined to form received signals. The method ends at step 524, but may resume again for error suppression, detection and decoding of a subsequent symbol.

As can be seen from the foregoing, the present invention provides method and apparatus for completely suppressing a designated set of interference in a DS-CDMA system. Receiver circuits are assigned to multipath from sectors both in soft handoff and not in soft handoff with the receiver. For each receiver circuit, a set of traffic channels present on the sector's signal is determined. For each receiver circuit, the interference is ranked according to predetermined criteria. A set of interference vectors is selected from the ranked lists of interference and an orthogonal projection is computed of the receiver's desired code or spread Walsh code relative to the selected set of interference vectors. The receiver circuit then uses the orthogonal projection in its correlator to despread received data.

The method and apparatus in accordance with the present invention provides unique features and advantages. For example the method applies linear, zero-forcing interference to a DS-CDMA system, such as an IS-95 downlink, having a spreading sequence spanning many symbols. As a result of this long spreading sequence, the multiple-access interference is time-varying. Despite the time varying nature if the interference, the method still provides complete suppression of a designated set of interference on a finger by finger basis. In an IS-95 mobile station, RAKE receiver fingers are assigned not only for the purpose of combining multipath, but also for the purpose of measuring interference parameters. Interference is ranked to determine which interference to suppress. In the illustrated embodiment, this ranking is done on a finger-by-finger basis and interference is suppressed on a finger-by-finger basis.

While a particular embodiment of the present invention has been shown and described, modifications may be made. It is therefore intended in the appended claims to cover all such changes and modifications which fall within the true spirit and scope of the invention.

What is claimed is:

1. A method for receiving signals in a receiver having a plurality of receiver circuits, the method comprising the steps of:

at each receiver circuit, detecting received multipath elements;

at each receiver circuit, ranking the detected received multipath elements according to predetermined criteria;

at each receiver circuit, selecting one or more interference vectors for suppression according to the ranking; and combining soft handoff multipath elements of the ranked multipath elements to form received signals.

2. A method as recited in claim 1 wherein the step of detecting the multipath elements comprises identifying a Walsh code assigned to the receiver by a base station of a communications system, the Walsh code corresponding to the multipath elements, and wherein ranking the received multipath elements comprises ranking multipath and Walsh code pairs.

3. A method as recited in claim 2 wherein the receiver is in soft handoff with one or more of the received multipath elements, and wherein combining the soft handoff multipath elements comprises combining multipath elements of the detected multipath elements corresponding to the soft handoff with the receiver.

4. A method as recited in claim 1 further comprising the step of, at each receiver circuit, completely suppressing multipath elements of the detected received multipath elements which meet a predetermined criterion.

5. A method as recited in claim 1, further comprising the steps of:

assigning each receiver of the plurality of receiver circuits to an assigned multipath element from the detected received multipath elements for demodulation by the receiver;

ranking interference from a sector corresponding to the assigned multipath element according to a predetermined criterion;

ranking interference from one or more multipath elements, of the detected received multipath elements, from sectors in soft handoff with the receiver according to the predetermined criterion;

ranking interference from one or more multipath elements, of the detected received multipath elements, from sectors not in soft handoff with the receiver according to the predetermined criterion; and selecting one or more multipath and Walsh code pairs for suppression according to the interference rankings.

6. A method as recited in claim 5 further comprising the steps of:

identifying interfering traffic channels among the one or more multipath elements;

determining interference vectors corresponding to the interfering traffic channels;

in response to the interference vectors, forming an orthogonal projection of a desired code; and correlating the one or more multipath elements with an appropriate orthogonal projection to completely suppress the identified interfering traffic channels.

7. A method as recited in claim 6 wherein identifying traffic channels comprises performing a Fast Hadamard Transform on a multipath element.

8. A method for receiving signals in a DS-CDMA communication system, the method comprising the steps of:

providing a RAKE receiver having a plurality of receiver fingers;

identifying a first multipath element;

assigning a first receiver finger to the first multipath element;

demodulating the first multipath element;

identifying a second multipath element;

assigning a second receiver finger to the second multipath element;

suppressing interference from a base station corresponding to delay of the second multipath element and identified by the second receiver finger; and otherwise, demodulating the second multipath element for combination with other multipath elements.

9. A method as recited in claim 8 wherein the step of demodulating comprises combining the second multipath element only if it corresponds to the base station in soft handoff with the RAKE receiver.

10. A method for receiving radio signals at a receiver, the method comprising the steps of:

(a) receiving a plurality of signals;

(b) determining a signal quality parameter for each of the plurality of signals;

(c) ranking the plurality of signals according to the signal quality parameter and selecting signals according to a predetermined criteria;

(d) suppressing the selected signals according to rank; and (e) combining remaining signals as received data.

11. A method as recited in claim 10 wherein combining the remaining signals comprises combining only signals received in soft handoff with the receiver.

12. A method as recited in claim 10 wherein step (a) comprises the steps of:

(a1) providing a RAKE receiver having a plurality of receiver fingers; and (a2) assigning the receiver fingers to one or more multipath elements, including a first multipath element, a second multipath element and a third multipath element, only the first multipath element and the second multipath element having sufficient signal quality to initiate communication.

13. A method as recited in claim 12 wherein multipath and Walsh code pairs interfering with a receiver finger are ranked according to the signal quality parameter independently of rankings performed at other receiver fingers.

14. A method as recited in claim 13 further comprising the step of performing a Fast Hadamard Transform at each receiver finger to identify traffic channels present.

15. A method as recited in claim 14 wherein performing the Fast Hadamard Transform comprises producing a list of Walsh codes for the traffic channels present and wherein suppressing selected signals comprises:

(d1) forming a projection of a Walsh code corresponding to a desired traffic channel orthogonal to the signals to be suppressed; and (d2) correlating each of the traffic channels present using an appropriate orthogonal projection.

16. A method as recited in claim 12 wherein steps (b)–(d) are performed on the plurality of receiver fingers on a receiver finger by receiver finger basis.

17. A communication system comprising:

a base station which transmits radio frequency (RF) signals, the RF signals formed by mixing a baseband signal with an RF carrier, the baseband signal being formed by spreading symbols with a periodic spreading sequence having a period substantially greater than a number of chips per symbol; and a mobile station including a receiver which receives the RF signals, producing downconverted RF signals, an interference ranking circuit for identifying interference, and an interference suppression correlator which completely suppresses the interference while demodulating the downconverted RF signals, producing received data.

18. A communication system as recited in claim 17 wherein the receiver of the mobile station is a RAKE receiver including a plurality of receiver fingers, each receiver finger including an interference suppression correlator.

19. A communication system as recited in claim 18 wherein each receiver finger further includes a despreader for despreading received data using the spreading sequence.

20. A communication system as recited in claim 17 wherein the interference ranking circuit comprises means for estimating and ranking interference according to predetermined criteria and means for selecting interference to be suppressed according to rank.

21. A communication system as recited in claim 20 wherein the mobile station further comprises a plurality of receiver circuits, each receiver circuit including independent means for ranking interference.

22. A communication system as recited in claim 21 wherein the interference ranking circuit further comprises a Fast Hadamard Transform calculator for determining which traffic channels are present and estimating relative strength of the traffic channels.

23. A communication system as recited in claim 20 wherein the mobile station further comprises means for producing one or more interference vectors, the one or more interference vectors corresponding to the interference to be suppressed.

24. A communication system as recited in claim 23 wherein the mobile station further comprises an orthogonal projection calculator which calculates an orthogonal projection of a desired code relative to the one or more interference vectors.

25. A communication system as recited in claim 24 wherein the desired code is a Walsh code.

26. A communication system as recited in claim 24 wherein the interference suppression correlator correlates the orthogonal projection and the received data.

27. A communication system as recited in claim 17 wherein the mobile station receives a desired code from the base station, the mobile station further comprising an orthogonal projection calculator which calculates an orthogonal projection of the desired code, the orthogonal projection being orthogonal to the interference.

28. A method for receiving data from a remote transmitter in a communication system, the method comprising the steps of:
   receiving at a receiver a desired code;
   detecting interference at the receiver;
   calculating an orthogonal projection of the desired code in response to the interference; and
   demodulating received data from the remote transmitter using the orthogonal projection.

29. A method as recited in claim 28 further comprising the steps of forming interference vectors and ranking the interference vectors according to a predetermined criterion.

30. A method as recited in claim 28 wherein the step of demodulating data comprises suppressing the interference.

31. A method as recited in claim 28 wherein demodulating data comprises correlating the data and the orthogonal projection.

32. A method as recited in claim 28 further comprising the step of providing a RAKE receiver having a plurality of receiver fingers, and wherein calculating the orthogonal projection and demodulating data are done independently at each receiver finger of the plurality of receiver fingers.

33. A method for receiving radio symbols at a communication device, the method comprising the steps of:
   (a) receiving a plurality of signals corresponding to a set of multipath delay elements;
   (b) determining a signal quality parameter for each of the set of multipath delay elements;
   (c) selecting a subset of the set of multipath delay elements in soft handoff with the communication device for combining according to the signal quality parameter;
   (d) for each of the subset of multipath delay elements, being combined, selecting a set of interfering signals to be suppressed; and
   (e) combining the selected subset of multipath delay elements after suppressing the set of interfering signals to be suppressed.

* * * * *